United States Patent
Gibson et al.

(10) Patent No.: US 7,412,544 B2
(45) Date of Patent: Aug. 12, 2008

(54) RECONFIGURABLE USB I/O DEVICE PERSONA

(75) Inventors: Gregg Kent Gibson, Apex, NC (US); Eric Richard Kern, Durham, NC (US); Shane Michael Lardinois, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 10/871,734

(22) Filed: Jun. 18, 2004

(65) Prior Publication Data

US 2005/0283549 A1 Dec. 22, 2005

(51) Int. Cl.
*G06F 3/00* (2006.01)

(52) U.S. Cl. .................. 710/8; 710/100; 710/300; 710/301; 709/220; 709/221; 709/222

(58) Field of Classification Search ............ 710/8
See application file for complete search history.

(56) References Cited

U.S. PATENT DOCUMENTS

| | | | |
|---|---|---|---|
| 5,440,697 A | 8/1995 | Boegel et al. | |
| 5,943,490 A | 8/1999 | Sample | |
| 6,011,915 A | 1/2000 | Aaker et al. | |
| 6,051,030 A | 4/2000 | Beausoleil et al. | |
| 7,028,133 B1 * | 4/2006 | Jackson | 710/313 |
| 2003/0065863 A1 | 4/2003 | Wyland | |
| 2004/0181601 A1 * | 9/2004 | Sakthikumar | 709/229 |
| 2004/0260936 A1 * | 12/2004 | Hiray et al. | 713/200 |
| 2005/0066106 A1 * | 3/2005 | Lee | 710/316 |

* cited by examiner

*Primary Examiner*—Niketa I Patel
(74) *Attorney, Agent, or Firm*—Cynthia S. Byrd; Dillon & Yudell LLP

(57) ABSTRACT

A method and system for allowing a server blade in a blade chassis to use a remote universal serial bus (USB) device. Multiple USB devices are coupled to a management module in the blade chassis. A persona describing only authorized USB devices is sent to a reconfigurable input/output (I/O) device in the server blade in the blade chassis, allowing the server blade to utilize the remote USB device(s).

12 Claims, 6 Drawing Sheets

RECONFIGURABLE USB I/O DEVICE PERSONA

BACKGROUND OF THE INVENTION

1. Technical Field

The present invention relates in general to the field of computers, and in particular to multiple server blades housed in a server chassis. Still more particularly, the present invention relates to a method and system for configuring an input/output processor on a server blade to allow multiple Universal Serial Bus (USB) devices to be connectible to the blade server.

2. Description of the Related Art

Server blade computers offer high-density server boards (blades) in a single server blade chassis (blade center chassis). A typical server blade computer is illustrated in FIG. 1, identified as server blade chassis 102. Server blade chassis 102 includes multiple hot-swappable server blades 104a-n. There are typically fourteen server blades 104 in server blade chassis 102. The operations of server blades 104 are coordinated by logic identified as management modules 108, each of which allocates jobs and data to the different server blades 104. Typically, a first management module 108a is designated as the primary management module, and a second management module 108b is a back-up to be used if the primary management module 108a should fail.

During configuration and set-up of server blades 104, server blade designers have to know which hardware devices they want installed on a blade planar. For example, when initially set up, server blade 104n was set up with a first USB port 110a coupled to a first USB device 112a, and a second USB port 110b coupled to a second USB device 112b. The USB devices 112 may be any USB compliant device, such as a CDROM (Compact Disk-Read Only Memory) drive, a modem, a mouse, a keyboard, a hard or floppy drive (or their image), or an Ethernet. Space must be allocated on the planar (physical board on which devices making up the server blade 104 are mounted) for both the USB ports 110 as well as the USB devices 112, thus fixing the function of each server blade 104 (and its associated devices) at design time.

What is needed, therefore, is a method and system for allowing multiple USB devices to be on-the-fly configurable on a server blade without the need for additional hardware connection points or hardware devices. Preferably, the method and system would use a reconfigurable input/output (I/O) processor, on the server blade, wherein the reconfigurable I/O processor would allow a user to choose the function of the reconfigurable I/O processor based on functionality required, local and remote security levels, and/or locally available resources.

SUMMARY OF THE INVENTION

Therefore, the present invention is directed to a method and system for allowing a server blade in a blade chassis to use a remote universal serial bus (USB) device. Multiple USB devices are coupled to a management module in the blade chassis. A persona describing only authorized USB devices is sent to a reconfigurable input/output (I/O) device in the server blade in the blade chassis, allowing the server blade to utilize the remote USB device(s).

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
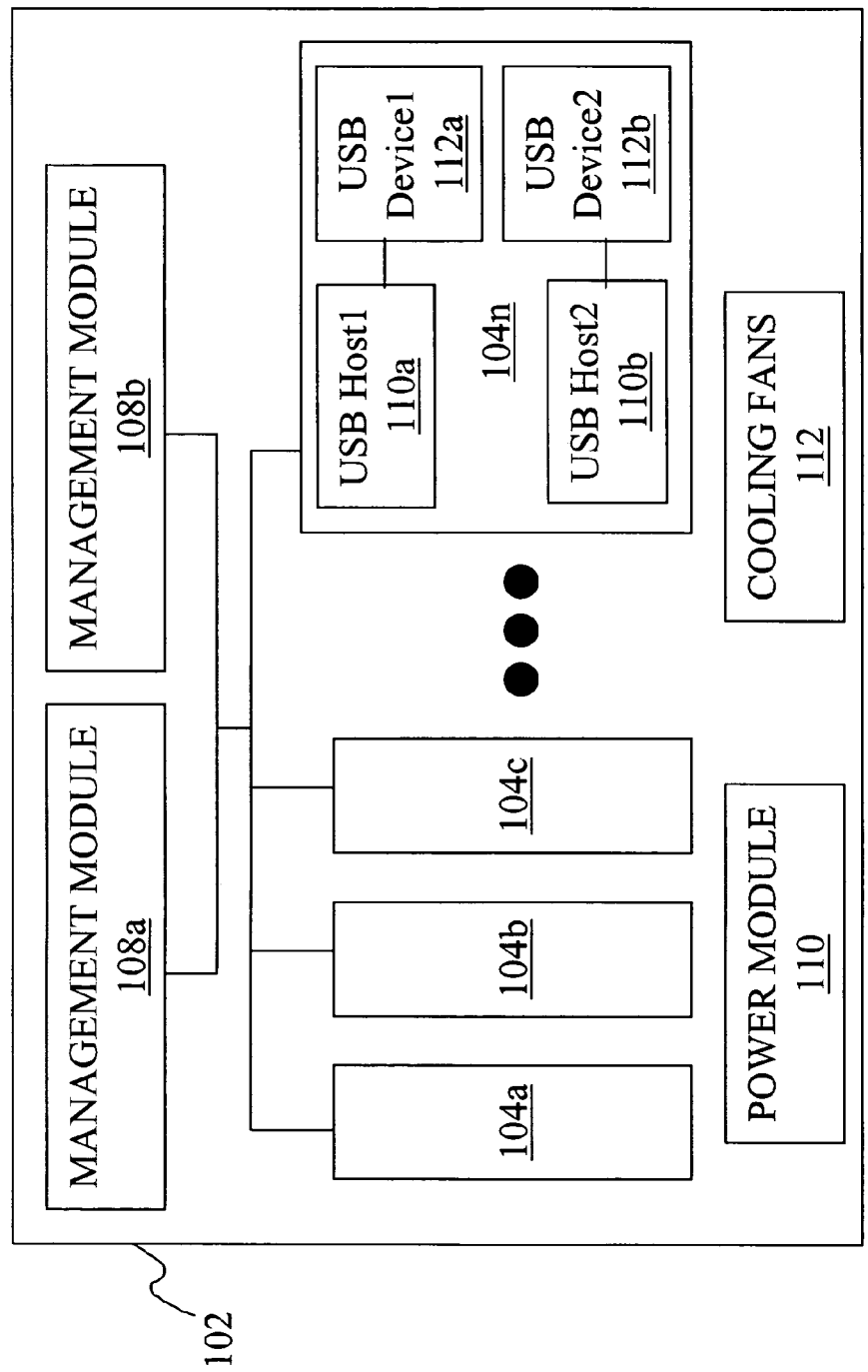
FIG. 1 depicts a prior art diagram of a server blade chassis having fixed universal serial bus USB devices.
Figure 2A:
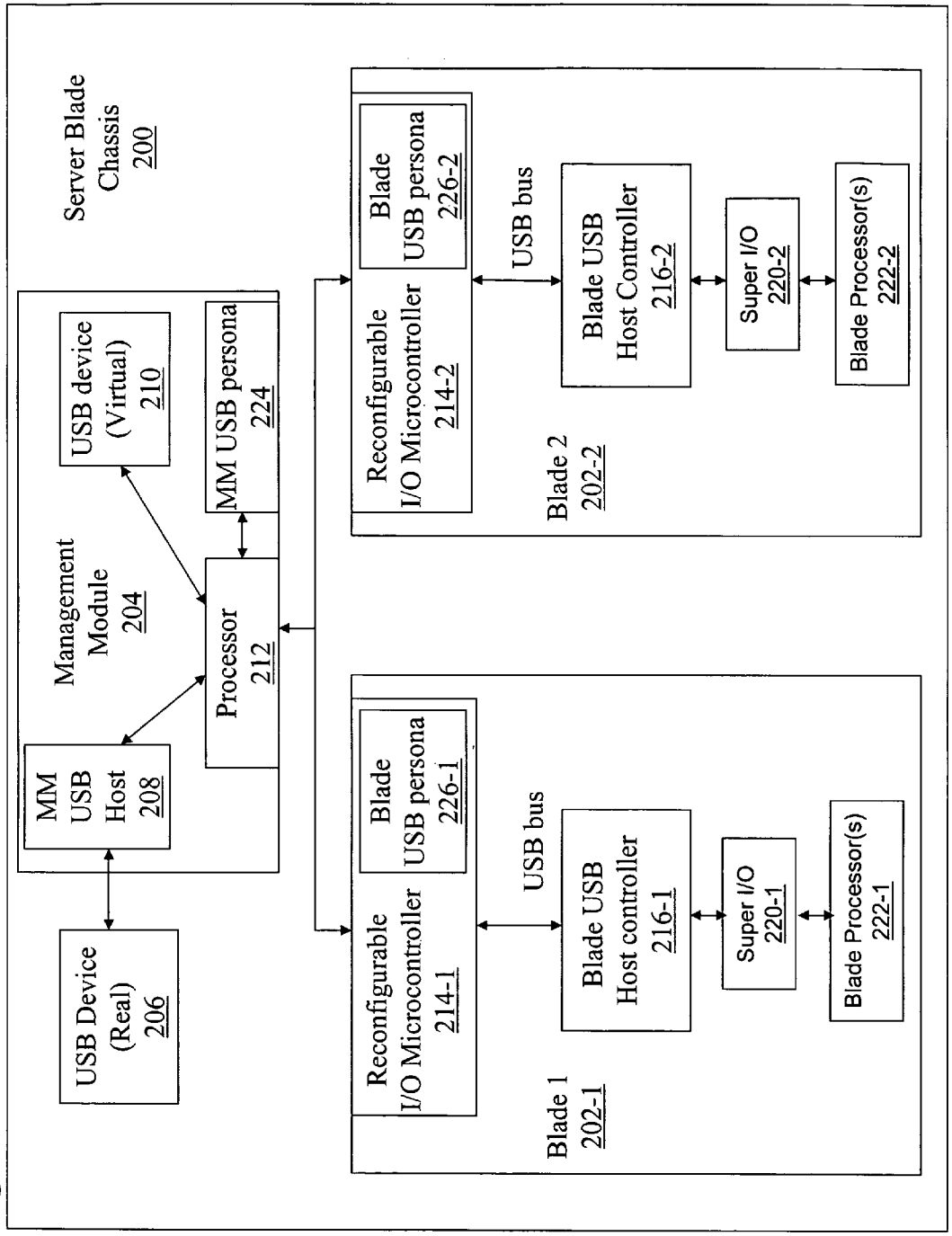
FIG. 2a illustrates a server blade chassis having multiple USB devices coupled to a management module in the server blade chassis.

With reference now to FIG. 2a, there is depicted a schematic block diagram of a server blade chassis 200 according to a preferred embodiment of the present invention. For the sake of clarity, only two server blades 202-1 and 202-2 are depicted. However, in a preferred embodiment, server blade chassis 200 is capable of connecting fourteen or more server blades 202 to a management module 204. Note that while management module 204 is depicted as a single management module, in a preferred embodiment server blade chassis 200 has two management modules (not shown), the first functioning as a primary management module and the second acting as a backup management module to the first management module.

Management module 204 is coupled to each server blade 202 via a reconfigurable input/output (I/O) microcontroller 214, also known in the art as a baseboard management controller (BMC). The reconfigurable I/O microcontroller 214 is coupled to a blade universal serial bus (USB) host controller 216 on a USB bus. The USB host controller 216 is coupled to a Super I/O 220, which affords I/O with the blade processors 222 of the server blade 202. Note that each server blade 202 may or may not have an external USB port. The present invention is particularly advantageous if the server blade 202 does not have an external USB port, as the present invention affords use of an external USB peripheral.

Coupled to management module 204 are USB devices, including real USB devices 206 and/or virtual USB devices 210. Real USB devices 206 include devices such as keyboards, mice, pointers, mass storage devices, modems, communication ports, and other peripheral devices that are in compliance with the Universal Serial Bus Specification published by Compaq, et al., Revision 2.0, dated Apr. 27, 2000 (or later revision), which is herein incorporated by reference in its entirety.

Stored management module 204 is a management module USB persona 224, which contains USB descriptors of all USB devices (real and virtual) that are coupled to management module 204. Management module 204, using a processor 212, selects which descriptors are authorized for a specific server blade 202 in the server blade chassis 200. The selected descriptors are then transmitted to a particular reconfigurable I/O microcontroller 214, which stores a blade USB persona 226 authorized for a specific server blade 202.

Figure 2B:
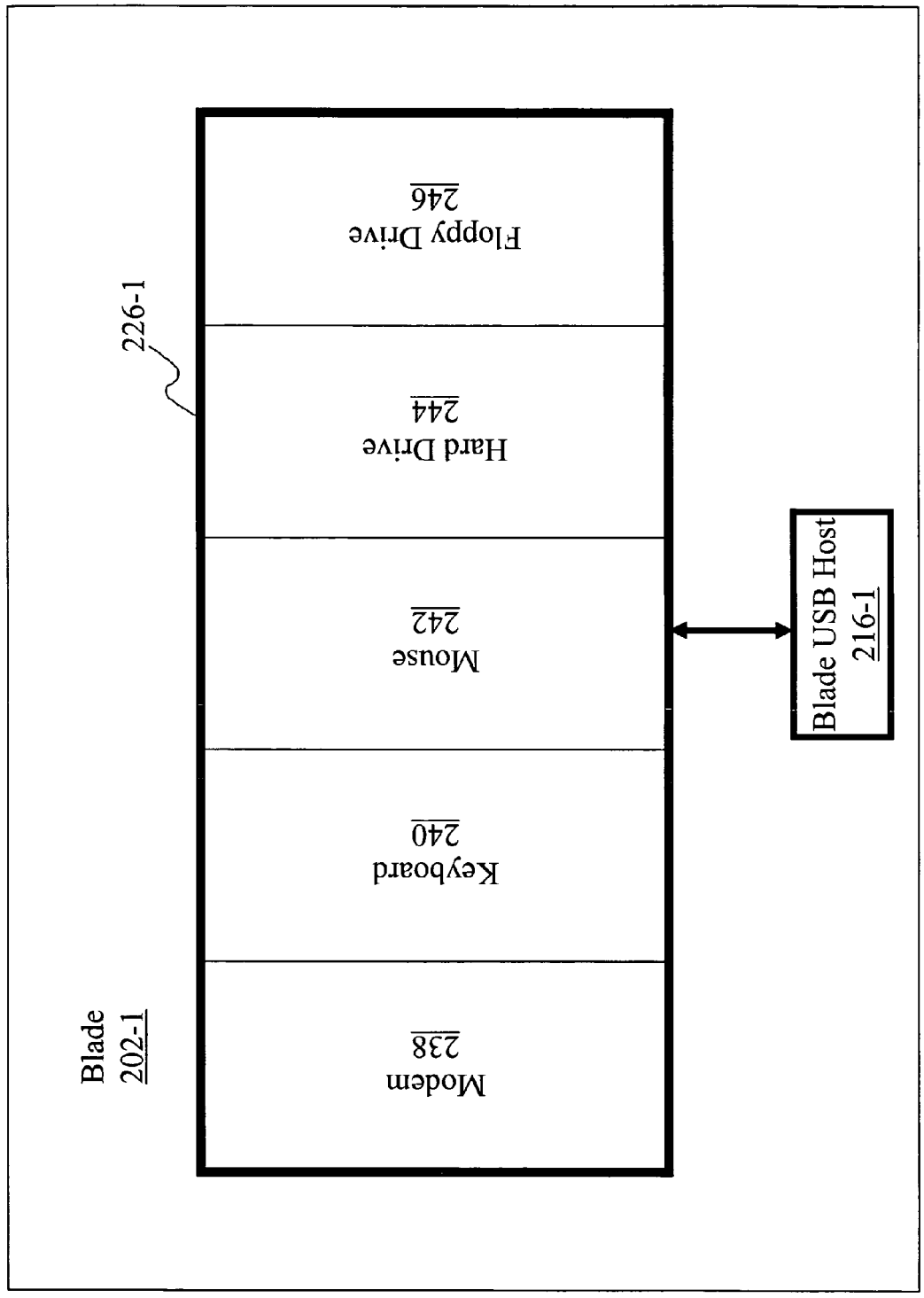
FIG. 2b depicts details of USB persona describing USB device characteristics.

For example, consider server blade 202-1. Assume that a system administrator has determined that server blade 202-1 is authorized to use five USB devices, denoted by their descriptors shown in FIG. 2b as a modem descriptor 238, a keyboard descriptor 240, a mouse descriptor 242, a hard drive descriptor 244, and a floppy drive descriptor 246. These descriptors are collectively known as blade USB persona 226-1.

When blade processor 222-1 needs a USB device described in blade USB persona 226-1, USB commands are sent to blade USB host controller 216-1, and then on to reconfigurable I/O microcontroller 214-1, where the USB commands are encapsulated in accordance with an appropriate USB descriptor in blade USB persona 226-1. For example, if an operating system (OS) running on blade processor 222-1 needs a USB hard drive, then USB commands from that OS (and perhaps software running on that OS) are sent to reconfigurable I/O microcontroller 214-1, where the USB commands are encapsulated incorporating hard drive descriptor 244, thus directing the USB commands to the proper USB device.

Figure 2C:
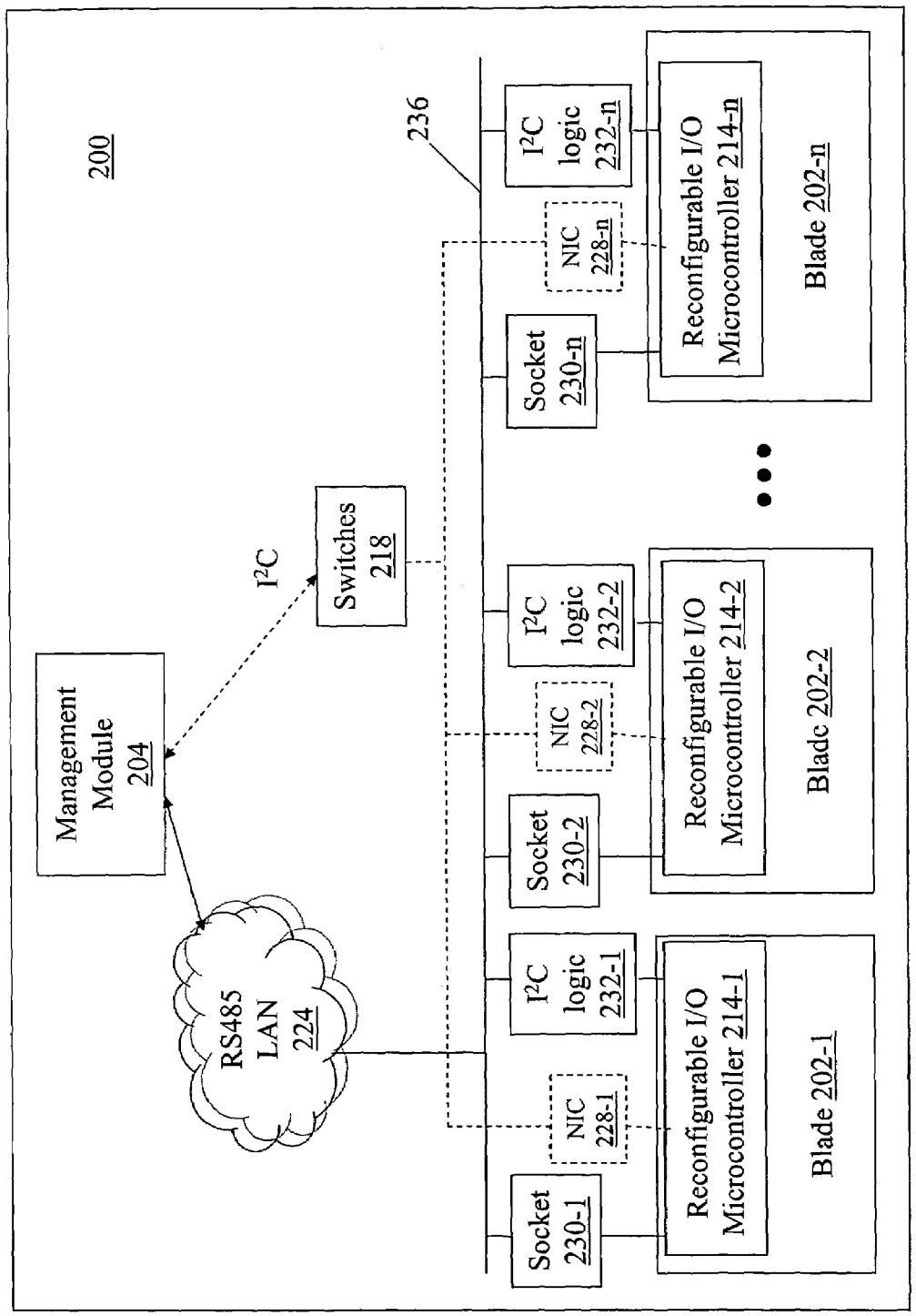
FIG. 2c illustrates additional detail on how server blades in the server blade chassis can be coupled to the management module.

With reference now to FIG. 2c, additional detail is depicted on alternative coupling systems between management module 204 and reconfigurable I/O microcontrollers 214. Management module 204 is coupled to server blades 202-(1-n) either via a Local Area Network (LAN) 224 or switches 218.

LAN 224 is preferably compliant with the Electronics Industry Association (EIA) RS485 Standard for data communication. LAN 224 couples to a midplane 236, which couples each blade 202 via a unique socket 230. Midplane 236 is a backplane, mounted in the middle of server blade chassis 200, that contains circuitry and sockets 230 into which additional electronic devices or cards, including server blades 202 can be plugged.

When a server blade 202 is plugged into a specific socket 230, a physical address is established for that server blade 202. For example, consider server blade 202-1 being plugged into socket 230-1. A control logic, depicted as $I^2C$ logic 232-1, which is compliant with the Phillips' Inter-IC (Inter-Integrated Circuit) standard (incorporated by reference in its entirety herein and commonly referred to as "$I^2C$"), detects the presence of server blade 202-1 in socket 230-1. $I^2C$ logic 232-1, operating in conjunction with management module 204, assigns a physical address on a bus in midplane 236 to server blade 202-1 when server blade 202-1 is plugged into socket 230-1. Preferably, each server blade 202 is associated with a unique $I^2C$ logic 232, which is preferably connected to midplane 236 as depicted in FIG. 2c. Alternatively, all server blades 202 can use a single $I^2C$ logic 232.

Alternatively, each server blade 202 may have a unique Internet Protocol (IP) address on midplane 236. That is, midplane 236 may support intercommunication using IP addressing protocol, in which each device connected or coupled to midplane 236 contains an IP address assigned by logic (not shown) that is either within or outside server blade chassis 200. For example, a Dynamic Host Configuration Protocol (DHCP) server (not shown) may be used to assign an IP address to server blade 202-1. Communication with server blade 202-1 is thereafter via a Network Interface Card (NIC) 228-1 that is associated with server blade 202-1, by sending data packets from the management module 204 via IP switches 218.

Figure 3:
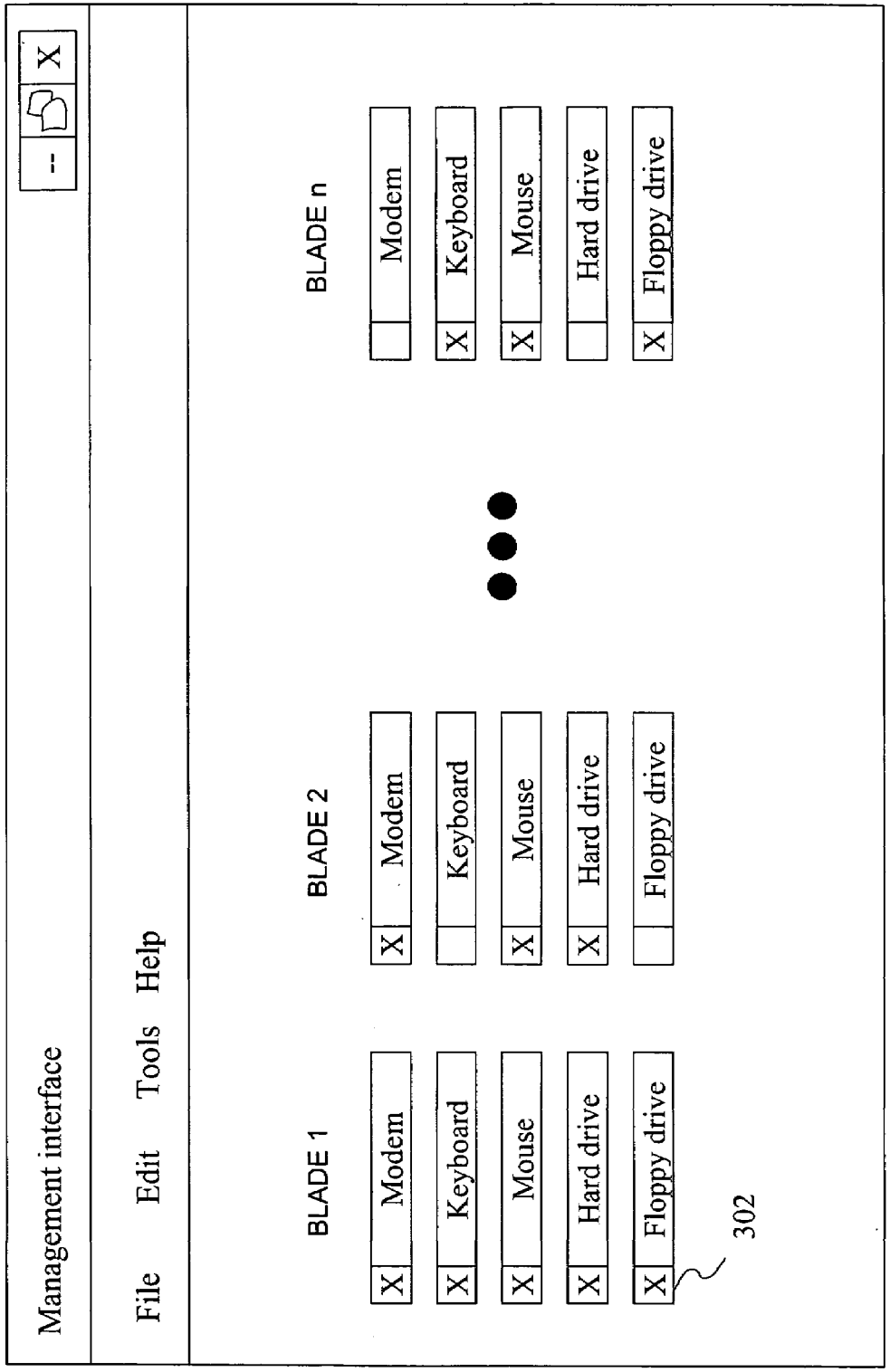
FIG. 3 depicts an exemplary graphical user interface (GUI) under the control of the management module to set up USB personas in the server blades.

With reference now to FIG. 3, there is depicted a graphical user interface (GUI) 300 available to a system administrator for determining which USB descriptors are available to specific server blades. For example, consider server blade 202-1, identified in FIG. 3 as "BLADE 1." As shown in FIG. 3, a system administrator has clicked hot buttons 302 selecting a USB modem, keyboard, mouse, hard drive and floppy drive to be available to Blade 1. This input causes the management module 204 (FIG. 2a) to load the USB descriptors for these USB devices into blade USB persona 226-1, which allows reconfigurable I/O microcontroller to encapsulate USB data accordingly. In a preferred embodiment, every USB device shown in GUI 300 is available to the system administrator (or an end user of the system), thus letting the user (or administrator) make the final decision as to which USB devices will be incorporated.

Figure 4:
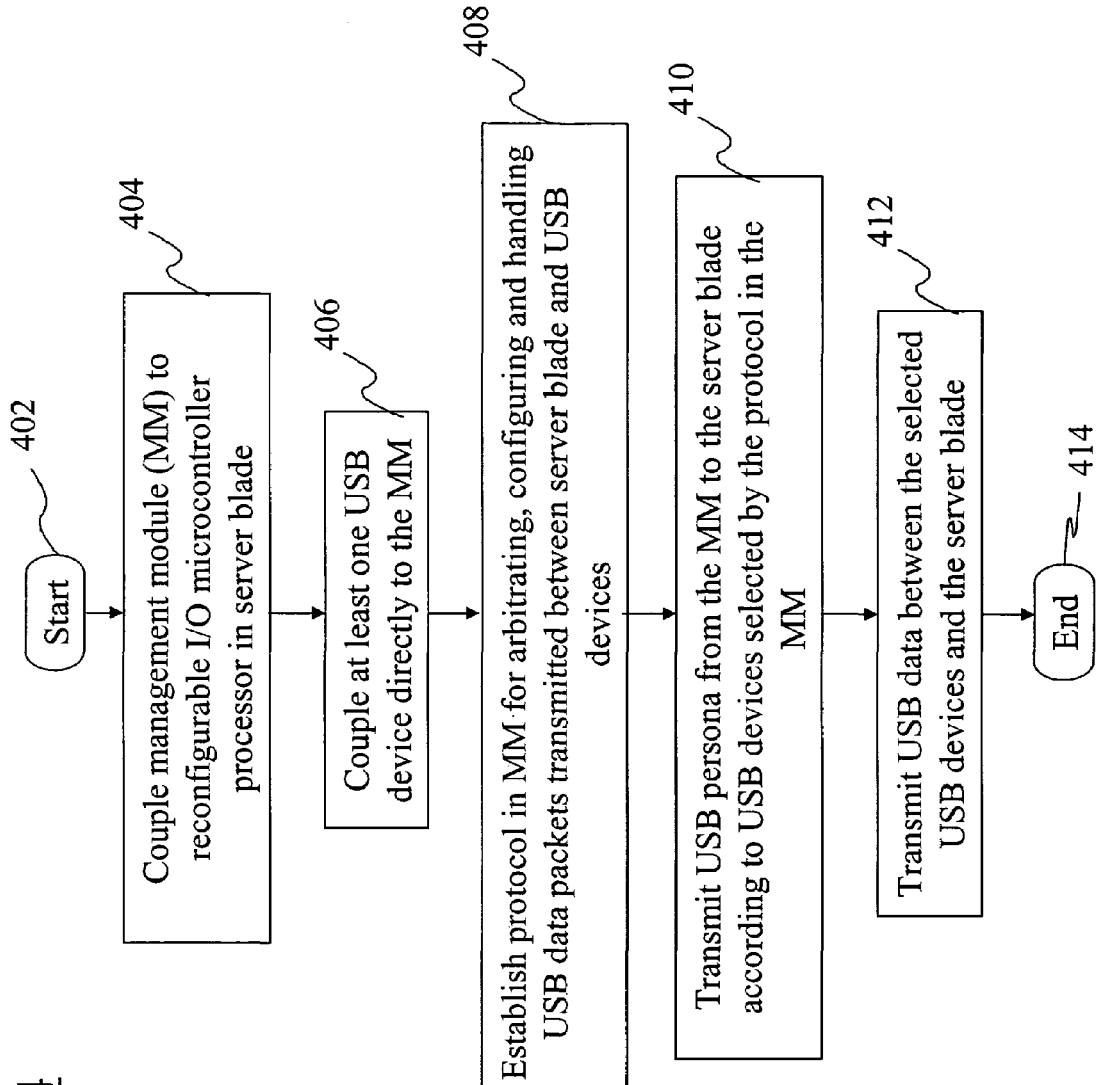
FIG. 4 is a flow-chart of steps taken according to a preferred embodiment of the present invention to permit the use of remote USB devices by one or more server blades.

With reference now to FIG. 4, a flow chart showing steps taken in a preferred embodiment of the present invention is shown. After initiator block 402, a management module is coupled to a reconfigurable I/O microcontroller in a server blade (block 404). At least one USB device is coupled directly to the management module (block 406), but the USB device is NOT coupled directly to any of the server blades in the server blade chassis. A protocol is established in the management module for arbitrating, configuring and handling USB data packets being transmitted between the management module and the server blade (block 408). This protocol is based on the USB persona stored in the server blade. The protocol defines which USB device is used by the server blade, and arbitrates USB data coming from different server blades. That is, more than one server blade may use a same USB device coupled to the management module, and thus the protocol tells the management module how to arbitrate USB data from the different server blades to allow concurrent use of the same USB device. In addition, the protocol can be further refined according to a particular user of one or more server blades, and allow/restrict that user from the use of specific USB devices.

The USB persona for each server blade is transmitted from the management module (block 410), thus describing which USB device(s) may be used by each server blade. Thereafter, USB data is transmitted back and forth from the authorized USB devices and the server blades (block 412), and the process ends (terminator block 414).

The present invention affords several improvements and novel functionality to system administrators. These features include, but are not limited to the following examples. First, the present invention allows USB devices to be controlled and/or restricted according to control exerted by the system administrator through the management module. That is, the system administrator can control access to remote USB devices by dynamically changing the USB persona in the management module, and thus the USB persona in specific server blades. Thus, hot-plugging (insertion and removal) of devices is permitted, allowing hardware function to change on-the-fly. Second, real or virtual (emulated) USB peripherals can be shared simultaneously, according to the protocol established in the management module. Third, expandability of a server blade is no longer limited to the physical ports on the server blade's planar, and thus the server blade has greatly improved scalability. Fourth, on multi-user systems, the system administrator can directly control which user of a system is allowed to have access to specific USB peripheral devices. Fifth, each server blade in a blade chassis can be customized according to the need/authorization of a user, software, or protocol. Sixth, if the server blade does not have a USB port that is externally accessible, the server blade can still use an external USB peripheral device using the reconfigurable I/O microcontroller with the downloaded USB persona from the management module.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

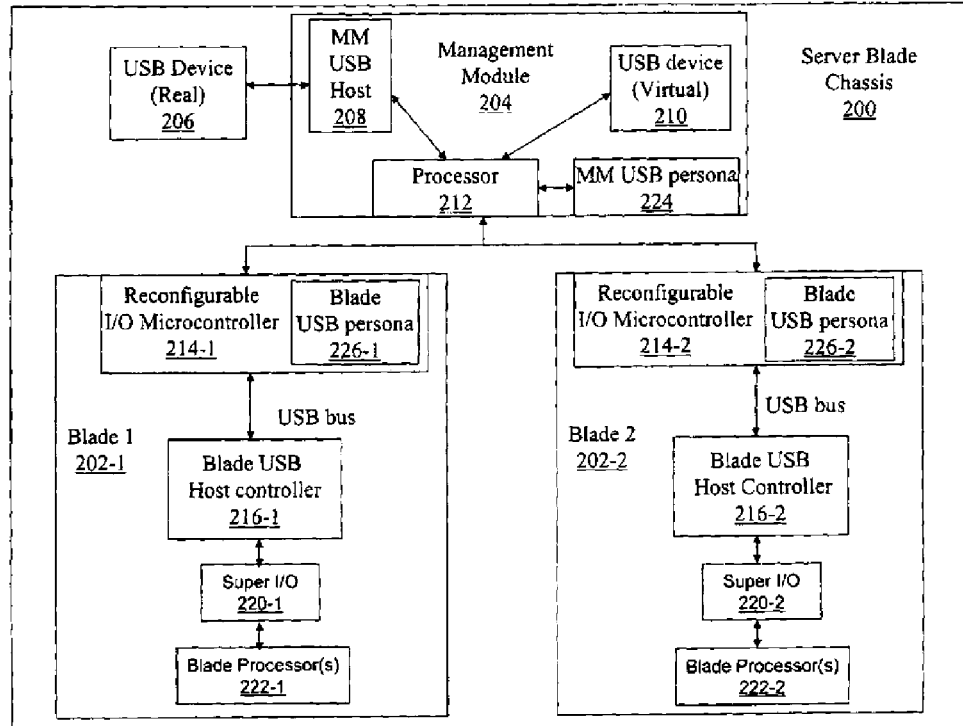

What is claimed is:

1. A method comprising:
   in a multi-blade chassis, coupling a management module to a reconfigurable input/output (I/O) processor in a server blade in the multi-blade chassis;
   coupling at least one of a plurality of USB devices to the management module, such that the plurality of USB devices is unable to directly communicate data to and from the server blade;
   setting up a protocol, in the management module, for arbitrating and handling universal serial bus (USB) data packets transmitted between the server blade and one or more of the plurality of USB devices;
   storing, in the management module, USB descriptors in a management module USB persona, wherein the USB descriptors describe all USB devices that are coupled to the management module;
   transmitting, from the management module USB persona to a blade USB persona in the server blade, one or more selected USB descriptors of one or more selected USB devices that have been selected by the management module as being authorized USB devices for the server blade;
   transmitting USB data from an internal USB host controller in the server blade to the reconfigurable I/O processor; and
   transmitting the USB data between the one or more selected USB devices and the reconfigurable I/O processor according to the protocol set up by the management module.

2. The method of claim 1, wherein at least one of the plurality of USB devices is a virtual USB device.

3. The method of claim 1, wherein the server blade does not have an external USB port, and thus is capable of using an external USB peripheral only through the use of the USB descriptor transmitted from the management module to the server blade's reconfigurable I/O processor.

4. The method of claim 1, further comprising:
   encapsulating the USB data in the reconfigurable I/O processor before transmitting the USB data to the management module.

5. The method of claim 1, further comprising:
   decoding the USB data received from the management module in the reconfigurable I/O processor.

6. The method of claim 1, further comprising:
   presenting, on a Graphical User Interface (GUI), a description of all USB devices that are available to the management module; and
   receiving an input from a system administrator, wherein the input from the system administrator defines which of the USB devices that are available to the management module are authorized for use by a user of the server blade.

7. A computer readable storage medium, wherein the computer readable storage medium has stored thereon a computer program product that comprises:
   program code for, in a multi-blade chassis, coupling a management module to a reconfigurable input/output (I/O) processor in a server blade in the multi-blade chassis;
   program code for coupling a plurality of USB devices to the management module, such that the plurality of USB devices is not directly coupled to the server blade;
   program code for setting up a protocol, in the management module, for arbitrating and handling universal serial bus (USB) data packets transmitted between the server blade and one or more of the plurality of USB devices;
   program code for transmitting, from the management module to the reconfigurable I/O processor, one or more USB descriptors respectively describing one or more selected USB devices from the plurality of USB devices coupled to the management module, the one or more transmitted USB descriptors being selected according to the protocol set up by the management module;
   program code for establishing a protocol limiting a specified server blade in the multi-blade chassis to the use of only specified USB devices coupled to the management module;
   program code for transmitting USB data from an internal USB host controller in the server blade to the reconfigurable I/O processor; and
   program code for transmitting the USB data between the one or more selected USB devices and the reconfigurable I/O processor according to the protocol set up by the management module.

8. The computer readable storage medium of claim 7, wherein at least one of the plurality of USB devices is a virtual USB device.

9. The computer readable storage medium of claim 7, wherein the server blade does not have an external USB port, and thus is capable of using an external USB peripheral only through the use of the USB descriptor transmitted from the management module to the server blade's reconfigurable I/O processor.

10. The computer readable storage medium of claim 7, wherein the computer program product further comprises:
    program code for encapsulating the USB data in the reconfigurable I/O processor before transmitting the USB data to the management module.

11. The computer readable storage medium of claim 7, wherein the computer program product further comprises:
    program code for decoding the USB data received from the management module in the reconfigurable I/O processor.

12. The computer readable storage medium of claim 7, wherein the computer program product further comprises:

program code for presenting, on a Graphical User Interface (GUI), a description of all USB devices that are available to the management module; and program code for receiving an input from a system administrator, wherein the input from the system administrator defines which of the USB devices that are available to the management module are authorized for use by the server blade.

* * * * *

UNITED STATES PATENT AND TRADEMARK OFFICE
CERTIFICATE OF CORRECTION

PATENT NO. : 7,412,544 B2
APPLICATION NO. : 10/871734
DATED : August 12, 2008
INVENTOR(S) : Gregg Kent Gibson, Eric Richard Kern and Shane Michael Lardinois It is certified that error appears in the above-identified patent and that said Letters Patent is hereby corrected as shown below:

In the Claims:

Beginning at col. 6, line 13, please delete claims 7-12.

Signed and Sealed this
Eighth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 7,412,544 B2  
APPLICATION NO. : 10/871734  
DATED : August 12, 2008  
INVENTOR(S) : Gregg Kent Gibson, Eric Richard Kern and Shane Michael Lardinois It is certified that error appears in the above-identified patent and that said Letters Patent is hereby corrected as shown below:

Delete the title page and substitute therefore the attached title page showing the corrected number of claims in patent.

In the Claims:

Beginning at col. 6, line 13, please delete claims 7-12.

This certificate supersedes the Certificate of Correction issued October 8, 2013.

Signed and Sealed this  
Twenty-ninth Day of October, 2013

Teresa Stanek Rea  
*Deputy Director of the United States Patent and Trademark Office*

(12) United States Patent
Gibson et al.

(10) Patent No.: US 7,412,544 B2
(45) Date of Patent: Aug. 12, 2008

(54) RECONFIGURABLE USB I/O DEVICE PERSONA

(75) Inventors: Gregg Kent Gibson, Apex, NC (US); Eric Richard Kern, Durham, NC (US); Shane Michael Lardinois, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 10/871,734

(22) Filed: Jun. 18, 2004

(65) Prior Publication Data
US 2005/0283549 A1 Dec. 22, 2005

(51) Int. Cl.
*G06F 3/00* (2006.01)
(52) U.S. Cl. .................. 710/8; 710/100; 710/300; 710/301; 709/220; 709/221; 709/222
(58) Field of Classification Search ............ 710/8
See application file for complete search history.

(56) References Cited

U.S. PATENT DOCUMENTS

| | | | |
|---|---|---|---|
| 5,440,697 A | 8/1995 | Boegel et al. | |
| 5,943,490 A | 8/1999 | Sample | |
| 6,011,915 A | 1/2000 | Aaker et al. | |
| 6,051,030 A | 4/2000 | Beausoleil et al | |
| 7,028,133 B1 * | 4/2006 | Jackson | 710/313 |
| 2003/0065863 A1 | 4/2003 | Wyland | |
| 2004/0181601 A1 * | 9/2004 | Sakthikumar | 709/229 |
| 2004/0260936 A1 * | 12/2004 | Hiray et al | 713/200 |
| 2005/0066106 A1 * | 3/2005 | Lee | 710/316 |

* cited by examiner

*Primary Examiner*—Niketa I Patel
(74) *Attorney, Agent, or Firm*—Cynthia S. Byrd; Dillon & Yudell LLP

(57) ABSTRACT

A method and system for allowing a server blade in a blade chassis to use a remote universal serial bus (USB) device. Multiple USB devices are coupled to a management module in the blade chassis. A persona describing only authorized USB devices is sent to a reconfigurable input/output (I/O) device in the server blade in the blade chassis, allowing the server blade to utilize the remote USB device(s).

6 Claims, 6 Drawing Sheets